(12) United States Patent
Rutman et al.

(10) Patent No.: US 12,344,197 B2
(45) Date of Patent: Jul. 1, 2025

(54) BASEPLATE-BASED ACCESSORY ATTACHMENT SYSTEM AND ATTACHMENT METHOD FOR VEHICLE

(71) Applicant: Ford Global Technologies, LLC, Dearborn, MI (US)

(72) Inventors: Matthew B. Rutman, Canton, MI (US); Eric S. Levine, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 17/716,036

(22) Filed: Apr. 8, 2022

(65) Prior Publication Data

US 2023/0110428 A1    Apr. 13, 2023

Related U.S. Application Data

(60) Provisional application No. 63/254,317, filed on Oct. 11, 2021.

(51) Int. Cl.
*B60R 9/06* (2006.01)
*B62D 33/023* (2006.01)

(52) U.S. Cl.
CPC .............. *B60R 9/06* (2013.01); *B62D 33/023* (2013.01)

(58) Field of Classification Search
CPC ................................ B60R 9/06; B62D 33/023
USPC ........................................................ 224/403
See application file for complete search history.

(56) References Cited

U.S. PATENT DOCUMENTS

| | | | |
|---|---|---|---|
| 3,899,805 A * | 8/1975 | McMillan | B32B 3/06 24/584.1 |
| 5,137,320 A | 8/1992 | Christensen | |
| 5,599,055 A * | 2/1997 | Brown | B62D 25/2054 410/97 |
| 5,976,672 A * | 11/1999 | Hodgetts | B60R 13/01 428/116 |
| 6,176,657 B1 * | 1/2001 | Romph | B60P 7/0892 410/121 |
| 6,254,162 B1 * | 7/2001 | Faber | B60R 5/04 224/539 |
| 6,575,679 B2 * | 6/2003 | Bourgault | B60P 7/12 410/94 |
| 6,648,569 B2 * | 11/2003 | Douglass | B60P 7/0892 410/46 |
| 8,011,692 B2 * | 9/2011 | Friesen | B60R 11/06 280/759 |
| 8,622,266 B2 * | 1/2014 | McMillan | B60R 3/007 224/323 |
| 8,701,950 B2 * | 4/2014 | Roach | B60P 7/0892 224/404 |
| 8,827,088 B1 * | 9/2014 | Krause | A61L 2/00 211/85.13 |

(Continued)

OTHER PUBLICATIONS

US 10,947,009 B2, 03/2021, Brunner et al. (withdrawn)

*Primary Examiner* — Peter N Helvey
(74) *Attorney, Agent, or Firm* — Vichit Chea; Carlson, Gaskey & Olds, P.C.

(57) ABSTRACT

An accessory attachment system includes a baseplate that provides an attachment interface on a vehicle. The baseplate is configured to engage with an accessory to secure the accessory to the vehicle. The baseplate and the accessory are configured to engage each other through an attachment system having feet that are each received within an apertures when engaged.

23 Claims, 3 Drawing Sheets

(56) References Cited

U.S. PATENT DOCUMENTS

| | | | |
|---|---|---|---|
| 9,636,429 B2 * | 5/2017 | Cushion | A61B 50/34 |
| 10,144,335 B2 | 12/2018 | Gomes et al. | |
| 10,179,547 B2 | 1/2019 | Flatebo et al. | |
| 10,501,939 B2 | 12/2019 | Nill | |
| 10,557,275 B2 * | 2/2020 | Lescord | E04G 1/36 |
| 10,583,962 B2 | 3/2020 | Brunner et al. | |
| 10,611,415 B2 | 4/2020 | West et al. | |
| 10,703,534 B2 | 7/2020 | Brunner et al. | |
| D895,966 S * | 9/2020 | Brunner | D3/294 |
| D895,967 S * | 9/2020 | Brunner | D3/294 |
| D896,517 S * | 9/2020 | Brunner | D3/294 |
| D896,518 S * | 9/2020 | Brunner | D3/294 |
| D897,103 S * | 9/2020 | Brunner | D3/294 |
| D898,320 S * | 10/2020 | Brunner | D34/23 |
| 10,829,962 B2 * | 11/2020 | Ruth | A47G 29/141 |
| 10,962,218 B2 * | 3/2021 | Plato | H02J 7/0045 |
| 10,981,696 B2 | 4/2021 | Brunner et al. | |
| D917,977 S * | 5/2021 | Brunner | D7/605 |
| D918,584 S * | 5/2021 | Brunner | D3/294 |
| D919,296 S * | 5/2021 | Brunner | D3/307 |
| 11,008,136 B2 | 5/2021 | Brunner et al. | |
| D920,671 S * | 6/2021 | Brunner | D3/294 |
| 11,027,883 B1 | 6/2021 | Brunner et al. | |
| D923,935 S * | 7/2021 | Brunner | D3/276 |
| 11,192,690 B1 | 12/2021 | Brunner et al. | |
| 11,268,691 B2 | 3/2022 | Plato et al. | |
| 11,365,026 B2 | 6/2022 | Brunner et al. | |
| 11,426,859 B2 * | 8/2022 | Squiers | A45F 3/047 |
| 11,427,382 B2 | 8/2022 | Brunner et al. | |
| 11,465,805 B2 | 10/2022 | Brunner et al. | |
| 11,554,898 B2 * | 1/2023 | Brunner | B65D 25/20 |
| 11,577,661 B2 * | 2/2023 | Reband | B60R 7/08 |
| 11,612,998 B1 * | 3/2023 | Byington | B25H 3/028 |
| | | | 211/126.1 |
| 2003/0205877 A1 * | 11/2003 | Verna | B65D 25/54 |
| | | | 280/79.11 |
| 2007/0009408 A1 * | 1/2007 | Riley | A61L 2/26 |
| | | | 422/300 |
| 2011/0155613 A1 * | 6/2011 | Koenig | B65D 21/0223 |
| | | | 206/503 |
| 2015/0130286 A1 * | 5/2015 | Kozasu | H01F 38/14 |
| | | | 307/104 |
| 2018/0161975 A1 * | 6/2018 | Brunner | A45C 7/005 |
| 2018/0220758 A1 * | 8/2018 | Burchia | B25H 3/02 |
| 2019/0225371 A1 * | 7/2019 | Hoppe | B25H 3/021 |
| 2023/0110428 A1 * | 4/2023 | Rutman | B60R 11/06 |
| | | | 414/462 |
| 2023/0116745 A1 * | 4/2023 | Salter | B60P 7/0815 |
| | | | 248/542 |

* cited by examiner

BASEPLATE-BASED ACCESSORY ATTACHMENT SYSTEM AND ATTACHMENT METHOD FOR VEHICLE

CROSS-REFERENCE TO RELATED APPLICATIONS

This application claims priority to U.S. Provisional Application No. 63/254,317, which was filed on 11 Oct. 2021 and is incorporated herein by reference.

TECHNICAL FIELD

This disclosure relates generally to an attachment system and, more particularly, to an attachment system that is used to secure accessories to a vehicle.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite.

SUMMARY

In some aspects, the techniques described herein relate to an accessory attachment system, including: a baseplate that provides an attachment interface on a vehicle, the baseplate configured to engage with an accessory to secure the accessory to the vehicle, the baseplate and the accessory configured to engage each other through an attachment system having a plurality of feet that are each received within one of a plurality of apertures when engaged.

In some aspects, the techniques described herein relate to an attachment system, wherein the plurality of apertures are within the baseplate, the plurality of feet each extending from a first side of the baseplate, through one of the plurality of apertures, and past an opposite, second side of the baseplate.

In some aspects, the techniques described herein relate to an attachment system, wherein the baseplate is attached directly to a floor of the vehicle such that the plurality of apertures are spaced a distance from the floor, the plurality of feet extending into an open area between the floor and the plurality of apertures.

In some aspects, the techniques described herein relate to an attachment system, wherein the vehicle is a pickup truck and the baseplate is attached directly a floor of a cargo bed of the pickup truck.

In some aspects, the techniques described herein relate to an attachment system, wherein the baseplate is configured to engage the accessory when the accessory is in a first position, and when the accessory is in a second position that is rotated relative to the first position.

In some aspects, the techniques described herein relate to an attachment system, wherein the baseplate is disposed along a plane, and a rotation of the accessory from the first position to the second position is a rotation about an axis that is normal to the plane.

In some aspects, the techniques described herein relate to an attachment system, wherein the plurality of apertures are in the baseplate, wherein the plurality of apertures includes at least four apertures distributed circumferentially about the axis.

In some aspects, the techniques described herein relate to an attachment system, wherein the baseplate is configured to engage with the accessory in a third position that is different than the first position and the second position, and further configured to engage the accessory in a fourth position that is different than the first position, the second position, and the third position.

In some aspects, the techniques described herein relate to an attachment system, wherein the first position, second position, third position, and fourth position are ninety degrees offset from each other.

In some aspects, the techniques described herein relate to an attachment system, wherein a profile of each aperture within the plurality of apertures is rectangular.

In some aspects, the techniques described herein relate to an attachment system, wherein the plurality of apertures are each configured to receive an E-track connector.

In some aspects, the techniques described herein relate to an accessory attachment method, including: receiving a plurality of feet within a plurality of apertures; and sliding an accessory relative to baseplate to engage the accessory with the baseplate and secure the accessory relative to a vehicle, the baseplate secured to the vehicle.

In some aspects, the techniques described herein relate to an attachment method, wherein the accessory is configured to engage the baseplate when the accessory is in a first position and when the accessory is in a different, second position where the accessory is rotated relative to the first position.

In some aspects, the techniques described herein relate to an attachment method, wherein the rotation of the accessory from the first position to the second position is a rotation about an axis that is normal to an attachment surface of the baseplate, the accessory interfacing directly with the attachment surface when the accessory is coupled to the baseplate.

In some aspects, the techniques described herein relate to an attachment method, wherein the baseplate is configured to engage the accessory in a third position that is different than the first position and the second position, and further configured to engage the accessory in a fourth position that is different than the first position, the second position, and the third position.

In some aspects, the techniques described herein relate to an attachment method, wherein the baseplate includes the apertures and the accessory includes the feet.

In some aspects, the techniques described herein relate to an attachment method, further including capturing part of the baseplate between the plurality of feet and another portion of the accessory to engage the accessory.

In some aspects, the techniques described herein relate to an attachment method, wherein the vehicle is a pickup truck and the baseplate is attached directly a floor of a cargo bed of the pickup truck.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a baseplate-based accessory attachment system for a vehicle. The system includes a baseplate that provides an attachment interface for securing accessories to the vehicle. Various types of accessories can be secured to the vehicle through the attachment interface provided by the baseplate. The number and positions of baseplates can be adjusted for particular vehicles or particular needs. The provides a user with a substantially modular attachment system.

Figure 1:
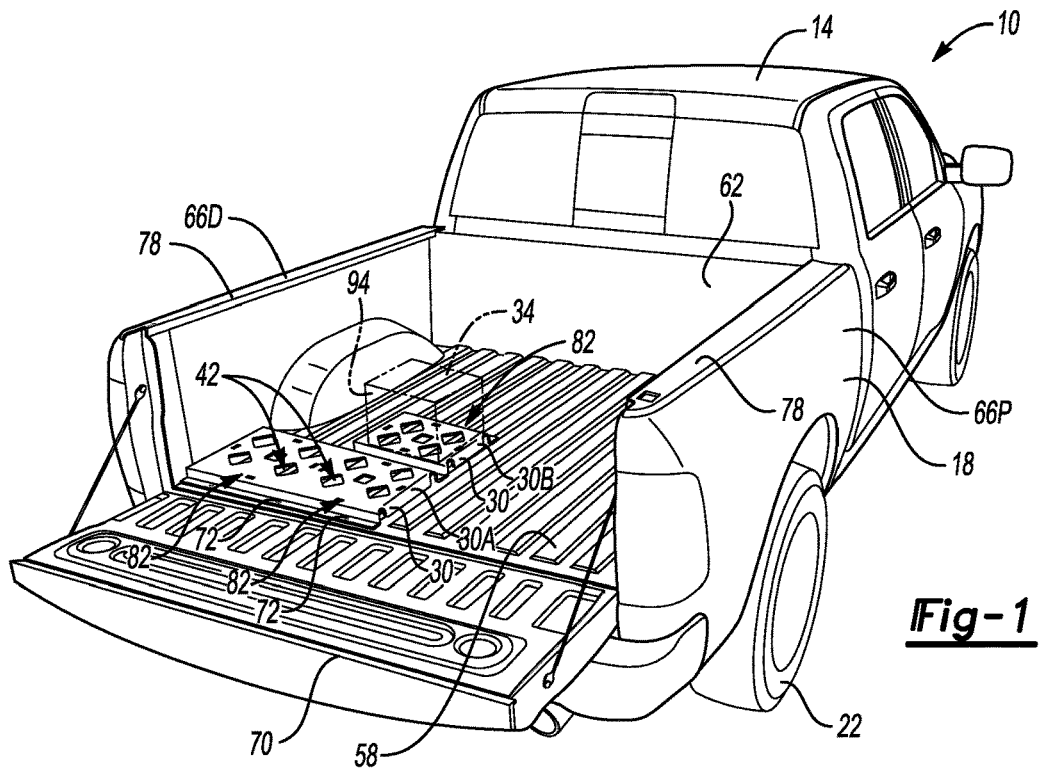
FIG. 1 illustrates a perspective view of a vehicle having a cargo bed equipped with baseplates that can be used to secure an accessory according to an exemplary aspect of the present disclosure.
Figure 2:
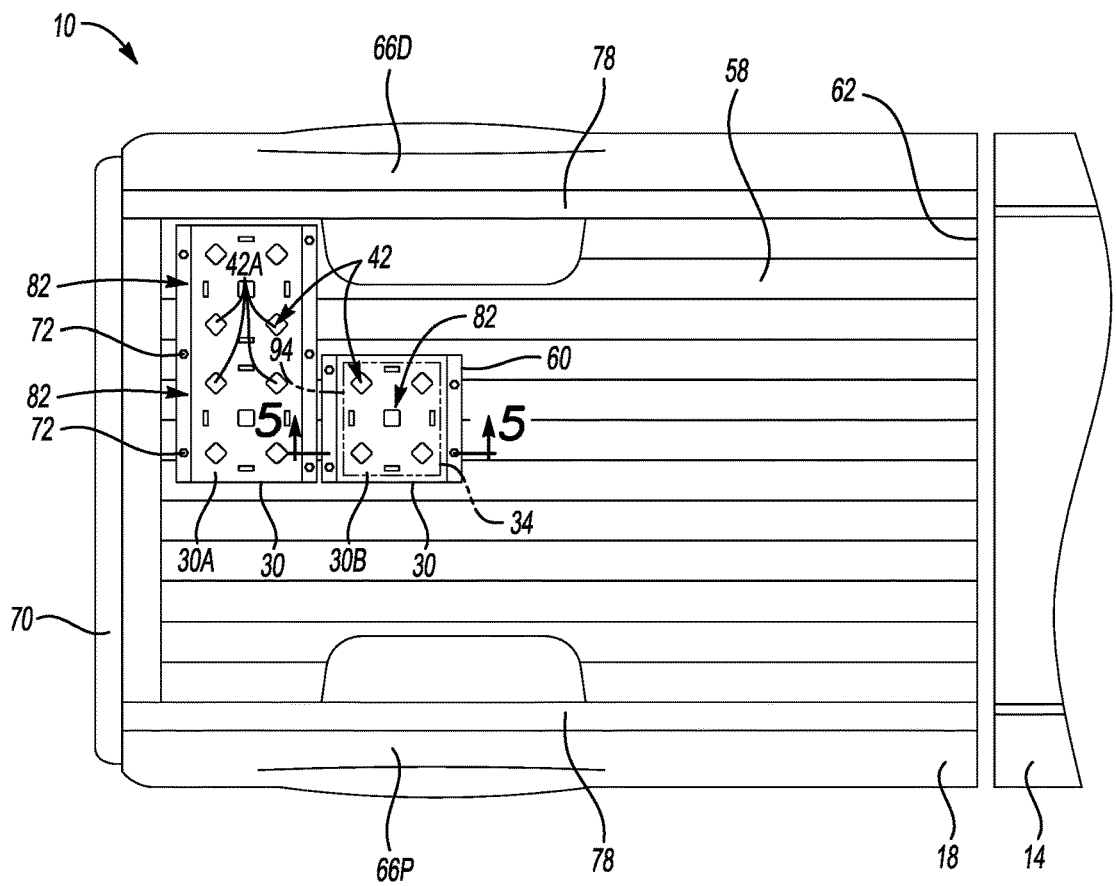
FIG. 2 illustrates a top view of the cargo bed and baseplates of FIG. 1.
Figure 3:
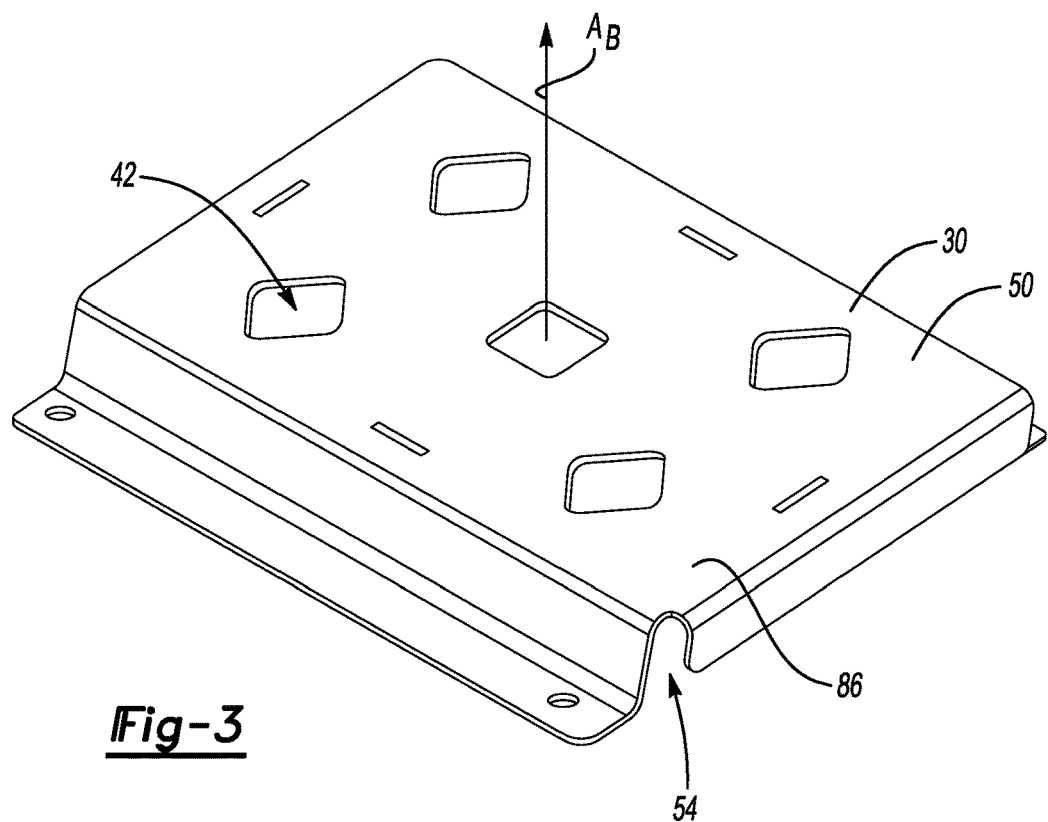
FIG. 3 illustrates a perspective view of one of the baseplates of FIG. 1.

With reference to FIGS. 1 and 2, a vehicle 10 includes a passenger compartment 14 and a cargo bed 18 that is aft the passenger compartment 14. The vehicle 10 is a pickup truck. The vehicle 10 could be another type of vehicle in another example, such as a car, van, sport utility vehicle, etc.

The example vehicle 10 is an electrified vehicle and, in particular, a battery electric vehicle (BEV). In another example, the vehicle 10 could be another type of electrified vehicle, such as a hybrid electric vehicle (HEV), plug-in hybrid electric vehicle (PHEV), or a conventional vehicle.

In particular, the example vehicle 10 includes an electrified powertrain capable of applying torque from an electric machine (e.g., an electric motor) to drive a pair of wheels 22. The vehicle 10 can include a traction battery pack, which powers the electric machine and, potentially, other electrical loads of the vehicle 10.

In the exemplary embodiment, a plurality of baseplates 30 are secured to the cargo bed 18. The baseplate 30A is larger than the baseplate 30B. Various accessories 34 can be secured to the vehicle 10 by engaging one or more of the baseplates 30. The accessories 34 can include a lockable storage box that holds tools, a refrigerator, etc. The accessory 34 could be a lidded lockable container. Still other example accessories could include: bicycle or motorcycle racks; ladder tacks; kayak racks; lighting stands, camping equipment, wood cutting equipment (e.g., chop saw), or partitions to separate sections of the cargo bed 18. Substantially any type of accessory having the requisite attachment interface can be secured to the vehicle 10 through the baseplates 30. For purposes of this disclosure, an accessory can be considered any item having this attachment interface.

With reference now to FIGS. 3-7 and continued reference to FIGS. 1 and 2, the accessories 34 can each engage one or more of the baseplates 30 via an attachment system. In the exemplary embodiment, the attachment system includes a plurality of apertures 42 and a plurality of feet 46.

In this example, the baseplates 30 provide the apertures 42 and the accessories 34 include the feet 46. This could be rearranged, however, such that some or all of the feet 46 extend from the baseplates 30 and the accessories 34 provide some or all of the apertures 42.

In the exemplary embodiment, when the baseplate 30 and the accessories 34 are engaged, the feet 46 are each received within one of the apertures 42 such that the feet 46 each extend from a first side 50 of the baseplate 30, through one of the apertures 42, and past an opposite, second side 54 of the baseplate 30.

The cargo bed 18 includes a floor 58, a front wall 62, a first side wall assembly 66D, a second side wall assembly 66P, and a tailgate assembly 70. In the exemplary embodiment, the baseplates 30 are attached directly to the floor 58.

Mechanical fasteners 72, welds, or another attachment could be used to secure peripheral flanges 74 of the baseplates 30 to the floor 58, which attaches the baseplates 30 to the floor.

The areas of the baseplate 30 that provide the apertures 42 are raised a distance R (FIG. 5) from the floor 58 when the baseplate 30 is attached to the floor 58. This provides an open area 76 between the floor 58 and the apertures 42. When the baseplate 30 and the accessories 34 are engaged, the feet 46 extend into the open area 76. The distance R and, for that matter, the open area 76, can be sized to facilitate cleaning between the floor 58 and the raised areas of the baseplates 30.

Although the exemplary embodiment shows the baseplates 30 attached to the floor 58, the baseplates 30 could instead or additionally be attached to other areas of the vehicle 10 including, but not limited to, the front wall 62, the side wall assemblies 66D, 66A, and the tailgate assembly 70.

In this example, the baseplates 30 are separate from the floor 58. In another example, the floor 58 provides the apertures 42 and can be considered the baseplate 30. Areas of the vehicle 10 other than the floor 58 could include apertures 42 or feet 46 and be considered the baseplate 30. For example, the tops 78 of the side wall assemblies 66P and 66D could include apertures 42 and be considered a baseplate.

In this example, each baseplate 30 includes at least one group 82 of the apertures 42. As shown in FIGS. 1 and 2, the baseplate 30A includes two groups 82 whereas the baseplate 30B includes one group 82.

A top or attachment surface 86 of each baseplate 30 is disposed along a plane. Each of the groups 82 of apertures 42 is circumferentially distributed about an axis AB that extends normal to that plane and thus normal to a top or attachment surface 86 of the baseplate 30.

Each of the groups 82 includes four apertures 42 circumferentially distributed a respective axis AB. The four apertures 42 within each of the groups 82 are each offset ninety degrees about the axis AB from the adjacent apertures 42 within that group 82.

Figure 6:
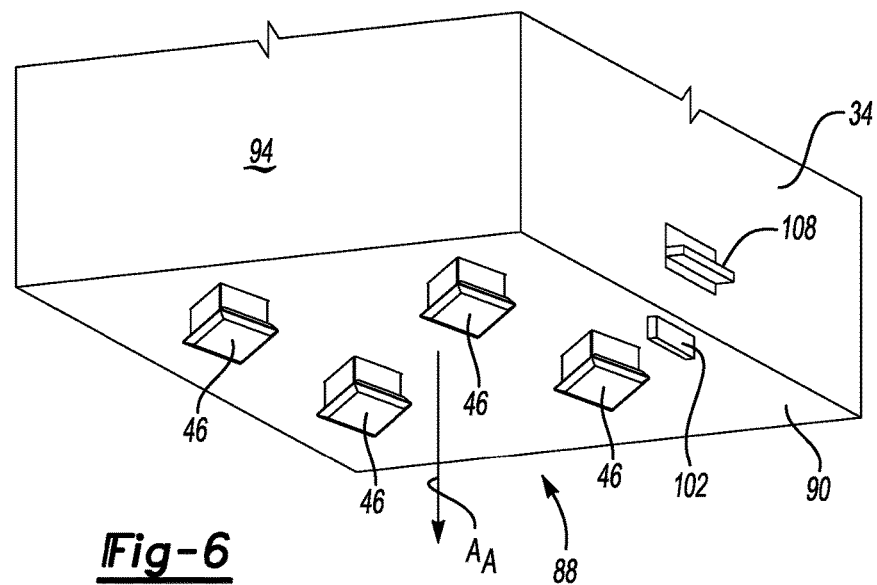
FIG. 6 illustrates a bottom view of the accessory of FIG. 1.
Figure 7:
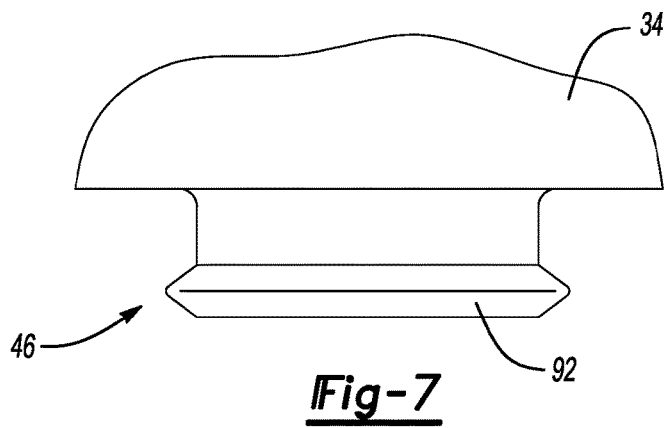
FIG. 7 illustrates a close-up view of a foot of the accessory of FIG. 6.

With reference now to FIGS. 6 and 7, the accessory 34 includes at least one group 88 of feet 46 that are circumferentially distributed about an axis AA that extends normal to a bottom surface 90 of the accessory 34. The accessory 34 includes a single group 88 of the feet 46. Other accessories could include more than one group 88 of feet 46.

Each of the groups 88 includes four feet 46 circumferentially distributed about the axis AA. The four feet 46 with each of the groups 88 are each offset ninety degrees about the axis AA from the adjacent feet 46 within that group 88. The feet 46 each extend from the accessory 34 to an enlarged collar 92, which gives each foot 46 an outwardly extending hook or lip.

With reference now to FIGS. 1-7, in this example, a profile of each of the example apertures 42 is rectangular.

Each of the apertures 42 include four corners 98. The apertures 42 are arranged such that one of the corners 98F is a forward corner, one of the corners 98R is a rear corner, one of the corners 98D is a driver side corner, and the other corner is a passenger side corner 98P.

When the baseplate 30 engages the accessory 34, the feet 46 of one of the groups 88 are each received within respective apertures 42. The baseplates 30 and apertures 42 can spaced such that the feet 46 in the group 88 of the accessory 34 can engage the four apertures 42 within group 82 on the outboard side of baseplate 30A, the four apertures 42 within the group 82 on the inboard side of baseplate 30A, or the four apertures 42 in the central area of baseplate 30, which are designated as apertures 42A in FIG. 2. In some examples, the accessory 34 could engage two apertures 42 within the baseplate 30A and two other apertures 42 in the baseplate 30B.

By using different arrangements of baseplates 30 and apertures 42, the cargo bed 18 can be configured to accommodate one or more accessories 34 in a wide variety of locations. The exemplary attachment system provided by the baseplates 30 is modular and can be adapted to particular user needs.

Due to the sizing and spacing of the apertures 42 and feet 46, the baseplate 30 and the accessory 34 are configured to engage each other when the accessory 34 is in a first position or, alternatively, when the accessory 34 is in a second position where the accessory 34 is rotated ninety degrees clockwise about a vertical axis relative to the first position. In this example, the baseplate 30 can additionally engage the accessory 34 when the accessory 34 is in a third position that is rotated ninety degrees clockwise from the second position, and when the accessory 34 is in a fourth position where the accessory 34 is rotated ninety degrees from the third position.

The rotation and offset of the accessory 34 between the first, second, third, and fourth positions can be a rotation and offset about the axis AA or AB, which are vertical axes in this example. The axes could extend in other non-vertical directions if, for example, the baseplate 30 were used in connection with an inner side of the side wall assemblies 66D and 66P.

Again, the first, second, third, and fourth positions are all ninety degrees offset from each other. This permits the baseplate 30 to engage the accessory 34 when a given side surface 94 of the accessory 34 is facing forward as shown, facing rearward, facing a driver side, or facing a passenger side. The ability to secure the accessory 34 in a variety of rotational orientations can enhance usability of the accessory 34.

A method of attaching the accessory 34 to the baseplate can include sliding the accessory 34 over the baseplate 30 until each of the feet 46 can be received within one of the apertures 42. The method can then include sliding the accessory 34 a bit more until the enlarged collars 92 of the feet 46 extend beneath the baseplate 30 and "hook" the accessory to the baseplate 30. Moving the feet 46 until the enlarged collars 92 at least partially extend beneath the baseplate 30 captures part of the baseplate 30 between the feet 46 and the bottom surface 90 of the accessory 34, which engages the accessory 34 with the baseplate 30.

The accessory 34, the baseplate 30, or both can include a locking system to hold the accessory 34 in this position. In this example, the locking system includes a lock member 102 that is received within one of a plurality of slots 106 of the baseplate 30. In the exemplary embodiment, the baseplates 30 include one of the slots 106 between each of the adjacent apertures 42. Thus, one of the slots 106 is available to receive the lock member 102 when the accessory 34 is in the first, second, third, or fourth position.

When the baseplate 30 and the accessory 34 are engaged, the lock member 102 is receivable within one of the slots 106 when the feet 46 are horizontally pressed into the corners 98 of the apertures 42. Locking the accessory 34 to the baseplate 30 while the accessory is moved into the corners 98 can help to align the accessory 34 relative to the baseplate 30. Locking in the accessory 34 with the feet 46 are biased or pressed into the corners 98 helps to ensure that portions of the enlarged collars 92 of the feet 46 can hook under the baseplate 30. This can help to keep the accessory 34 and the baseplate 30 engaged.

A biasing member, such as a spring, can bias the lock member 102 into the slot 106. To disengage the accessory 34 from the baseplate 30, a user can lift a tab 108. The lifting overcomes the biasing force and withdraws the lock member 102 from the respective slot 106. The accessory 34 can then slide horizontally to a position where the enlarged collars 92 are unhooked from the baseplate 30 so that the accessory 34 can be lifted and the feet 46 withdrawn from the apertures 42.

The accessory 34 can then be removed and replace with a different accessory. The user can, for example, hold tools for a certain type of job within the accessory 34. When the user needs to work on a different second type of job, the user can swap the accessory 34 for another accessory having specialized tools for the second type of job.

In some examples, the accessory 34 can be electrically coupled to the vehicle 10 through the baseplate 30. This could allow the accessories 34 to be powered. For example, the accessory 34 could be a refrigerated container that is powered by the vehicle 10 when the accessory 34 is engaged with the baseplate 30. In another example, the accessory 34 could hold rechargeable tools, which can be recharged when held within the accessory 34 due to the accessory being powered.

The accessory 34 could also be in communication with the vehicle 10 through the baseplate 30. The accessory 34 could, for example, couple to a communication link or bus when the accessory is engaged with the baseplate 30. The vehicle 10 and user could rely on the communication link to identify what type of accessory 34 is coupled to the baseplate 30, or to help locate the accessory 34 on the vehicle 10.

Figure 4:
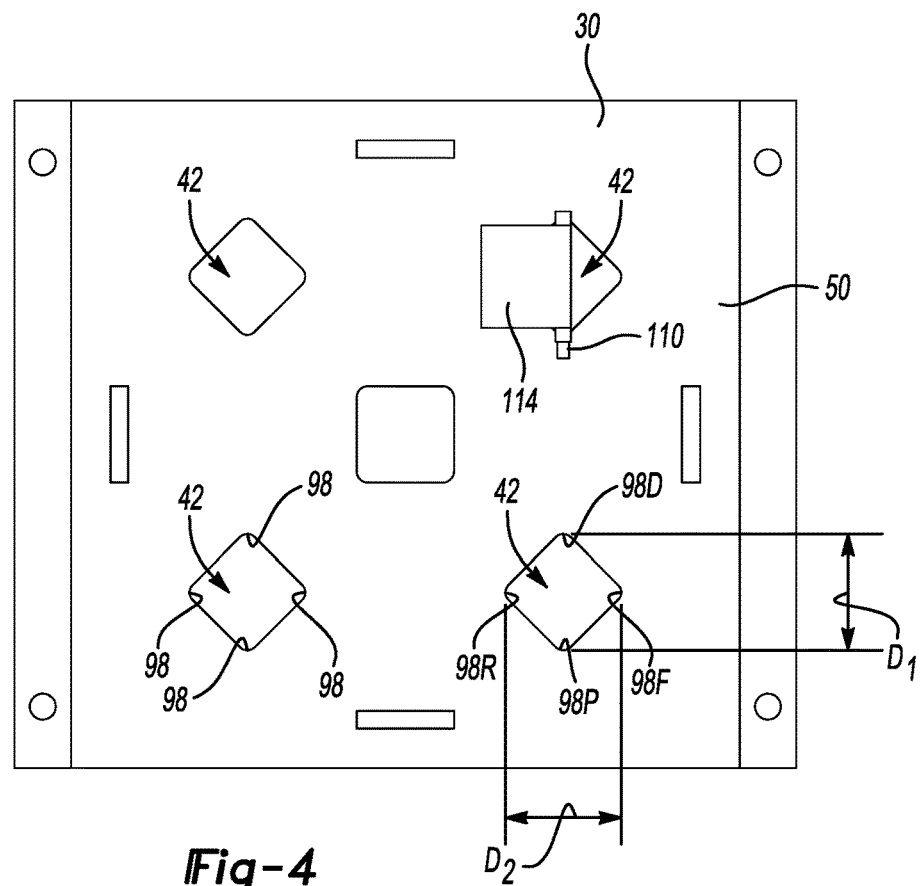
FIG. 4 illustrates a top view of the baseplate of FIG. 3.
Figure 5:
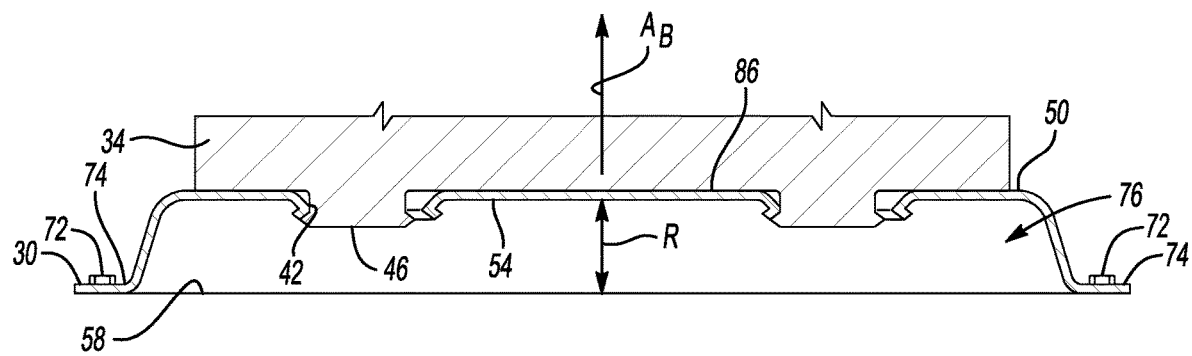
FIG. 5 illustrates a section view taken at line 5-5 in FIG. 2.

In addition to the accessory 34, the apertures 42 can be utilized to connect other types of items to the vehicle 10. For example, the apertures 42 can be sized such that a distance D1 from the forward corner 98F and the rear corner 98R is the same as a distance D2 from the driver side corner 98D to the passenger side corner 98P. The apertures 42 are sized further such that the distances D1 and D2 are suitable for accommodating an E-track connector 110 as shown in FIG. 4.

The E-track connector 110 can be part of an E-track system that is used to help secure cargo carried within the cargo bed 18. The E-track connector 110 can engage the baseplate 30 to, for example, provide an anchor for a tie down strap 114. The E-track connector can be a tie-down ring, a hook, a socket, etc.

Building on the modularity of the accessory attachment system, the apertures 42 in the baseplates 30 can be configured to work with other attachment related items. The apertures 42 could, for example, accommodate buckles, or bores for bolt down connections. The areas of the baseplate 30 around the apertures 42 can be reinforced if required.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An accessory attachment system, comprising:
a baseplate that provides an attachment interface on a vehicle, the baseplate configured to engage with an accessory to secure the accessory to the vehicle, the baseplate and the accessory configured to engage each other through an attachment system having a plurality of feet that are each received within one of a plurality of apertures when engaged, wherein the plurality of apertures include a first set of apertures and a second set of apertures that are different than the first set of apertures, wherein the first set of apertures are coplanar with the second set of apertures, and wherein the first set of apertures comprises a mounting characteristic and the second set of apertures comprises a locking characteristic that is associated with the accessory; and
wherein the first set of apertures is divided into a plurality of subgroups, where each subgroup includes a center aperture defining an axis and a plurality of surrounding apertures that are circumferentially distributed around the center aperture relative to the axis, and wherein each pair of adjacent apertures of the plurality of surrounding apertures is associated with at least one aperture of the second set of apertures.

2. The attachment system of claim 1, wherein the plurality of apertures are within the baseplate such that each aperture of the first set of apertures and the second set of apertures extends from an upper surface of the baseplate to a lower surface of the baseplate, and wherein the plurality of feet each extend from a first side of the baseplate, through one aperture of the first set of apertures, and past an opposite, second side of the baseplate.

3. The attachment system of claim 2, wherein the baseplate is attached directly to a floor of the vehicle such that the plurality of apertures are spaced a distance from the floor to provide an open area between the floor and the plurality of apertures, the plurality of feet extending into the open area between the floor and the first set of apertures and a lock member associated with the accessory extending into the open area between the floor and the second set of apertures.

4. The attachment system of claim 1, wherein the vehicle is a pickup truck and the baseplate is attached directly a floor of a cargo bed of the pickup truck.

5. An accessory attachment system, comprising:
a baseplate that provides an attachment interface on a vehicle, the baseplate configured to engage with an accessory to secure the accessory to the vehicle, the baseplate and the accessory configured to engage each other through an attachment system having a plurality of feet that are each received within one of a plurality of apertures when engaged, wherein the plurality of apertures include a first set of apertures and a second set of apertures that are different than the first set of apertures, wherein the first set of apertures are coplanar with the second set of apertures, and wherein the first set of apertures comprises a mounting characteristic and the second set of apertures comprises a locking characteristic that is associated with the accessory; and
wherein the baseplate is configured to engage the accessory when the accessory is in a first position, and when the accessory is in a second position that is rotated relative to the first position.

6. The attachment system of claim 5, wherein the baseplate is disposed along a plane, and a rotation of the accessory from the first position to the second position is a rotation about an axis that is normal to the plane.

7. The attachment system of claim 6, wherein the plurality of apertures are in the baseplate, wherein the first set of apertures includes at least four apertures distributed circumferentially about the axis.

8. The attachment system of claim 5, wherein the baseplate is configured to engage with the accessory in a third position that is different than the first position and the second position, and further configured to engage the accessory in a fourth position that is different than the first position, the second position, and the third position.

9. The attachment system of claim 8, wherein the first position, second position, third position, and fourth position are ninety degrees offset from each other.

10. The attachment system of claim 1, wherein a profile of each aperture within the plurality of apertures is rectangular.

11. The attachment system of claim 1, wherein the plurality of apertures are each configured to receive an E-track connector.

12. The attachment system of claim 1, wherein the first set of apertures and the second set of apertures are formed in an upper surface of the baseplate and have different sizes.

13. The attachment system of claim 1, wherein the first set of apertures and the second set of apertures are formed in an upper surface of the baseplate and have different shapes.

14. The attachment system of claim 1, wherein the accessory includes at least one lock member, and wherein the locking characteristic comprises a selective interaction between the at least one lock member and the baseplate such that the at least one lock member is selectively moveable between an accessory lock position and an accessory unlocked position.

15. The attachment system of claim 14, wherein the mounting characteristic comprises one or more feet of the plurality of feet being received within an aperture from the first set of apertures, and wherein the locking characteristic comprises the at least one lock member being received within an aperture from the second set of apertures, and wherein the at least one lock member is biased toward the accessory lock position when aligned with an aperture from the second set of apertures.

16. An accessory attachment system, comprising:
a baseplate that provides an attachment interface on a vehicle, the baseplate configured to engage with an accessory to secure the accessory to the vehicle, the baseplate and the accessory configured to engage each other through an attachment system having a plurality of feet that are each received within one of a plurality of apertures when engaged, wherein the plurality of apertures include a first set of apertures and a second set of apertures that are different than the first set of apertures, wherein the first set of apertures are coplanar with the second set of apertures, and wherein the first set of apertures comprises a mounting characteristic and the second set of apertures comprises a locking characteristic that is associated with the accessory; and
wherein the first set of apertures is divided into a plurality of subgroups, where each subgroup includes a center aperture defining an axis and a plurality of surrounding apertures that are circumferentially distributed around the center aperture relative to the axis, and wherein the surrounding apertures within each of subgroup are each offset ninety degrees relative to the center aperture about the axis such that center aperture has a different orientation than the surrounding apertures.

17. The attachment system of claim 16, wherein the plurality of surrounding apertures comprise at least four apertures.

18. An accessory attachment system, comprising:
a baseplate that provides an attachment interface on a vehicle, the baseplate configured to engage with an accessory to secure the accessory to the vehicle, the baseplate and the accessory configured to engage each other through an attachment system having a plurality of feet that are each received within one of a plurality of apertures when engaged, wherein the plurality of apertures include a first set of apertures and a second set of apertures that are different than the first set of apertures, wherein:
the first set of apertures is divided into a plurality of subgroups, where each subgroup includes a center aperture defining an axis and a plurality of surrounding apertures that are circumferentially distributed around the center aperture relative to the axis, and wherein the surrounding apertures within each of subgroup are each offset ninety degrees relative to the center aperture about the axis such that center aperture has a different orientation than the surrounding apertures; and
the first set of apertures have a rectangular shape defined by a first pair of sides that connect a second pair of sides, and wherein the first pair of sides and the second pair of sides of the center aperture are non-parallel with the first pair of sides and the second pair of sides of the surrounding apertures.

19. An accessory attachment system, comprising:
a baseplate that provides an attachment interface on a vehicle, the baseplate configured to engage with an accessory to secure the accessory to the vehicle, the baseplate and the accessory configured to engage each other through an attachment system having a plurality of feet that are each received within one of a plurality of apertures when engaged;
wherein the plurality of apertures is divided into a plurality of subgroups, where each subgroup includes a center aperture defining an axis and a plurality of surrounding apertures that are circumferentially distributed around the center aperture relative to the axis, and wherein the surrounding apertures within each of subgroup are each offset ninety degrees relative to the center aperture about the axis such that center aperture has a different orientation than the surrounding apertures; and
wherein the plurality of apertures comprise mounting apertures and including a plurality of locking apertures separate from the mounting apertures, wherein each locking aperture extends through a thickness of the baseplate from a top surface of the baseplate to a lower surface of the baseplate, and each locking aperture is configured to receive at least one lock member to lock the accessory to the baseplate.

20. The attachment system of claim 19, wherein the at least one lock member selectively locks the accessory to the baseplate by being selectively moveable between an accessory lock position and an accessory unlocked position, and wherein the at least one lock member is biased toward the accessory lock position when aligned with an aperture from the plurality of locking apertures.

21. The attachment system of claim 20, wherein the plurality of locking apertures are coplanar with the mounting apertures and have a different size and/or shape than the mounting apertures.

22. The attachment system of claim 19, wherein the plurality of surrounding apertures comprise at least four apertures.

23. An accessory attachment system, comprising:
a baseplate that provides an attachment interface on a vehicle, the baseplate configured to engage with an accessory to secure the accessory to the vehicle, the baseplate and the accessory configured to engage each other through an attachment system having a plurality of feet that are each received within one of a plurality of apertures when engaged; and
wherein the plurality of apertures is divided into a plurality of subgroups, where each subgroup includes a center aperture defining an axis and a plurality of surrounding apertures that are circumferentially distributed around the center aperture relative to the axis, and wherein the surrounding apertures within each of subgroup are each offset ninety degrees relative to the center aperture about the axis such that center aperture has a different orientation than the surrounding apertures; and
wherein plurality of apertures have a rectangular shape defined by a first pair of sides that connect a second a pair of sides, and wherein the first pair of sides and the second pair of sides of the center aperture are non-parallel with the first pair of sides and the second pair of sides of the surrounding apertures.

* * * * *